Patented Apr. 17, 1945

2,374,098

UNITED STATES PATENT OFFICE 2,374,098

PRESERVATION OF RUBBER

Joseph R. Ingram, Nitro, W. Va., assignor to Monsanto Chemical Company, St. Louis, Mo., a corporation of Delaware No Drawing. Application January 14, 1943,
Serial No. 472,399

18 Claims. (Cl. 260—800)

The present invention relates to a method of retarding or preventing the deterioration of a rubber due to aging or exposure to the atmosphere and to the rubber compositions so obtained. It has long been known that such deterioration can be greatly retarded by treating the rubber before or after vulcanization with certain substances known as age-resisters or antioxidants. One object of this invention is to provide a superior class of antioxidants for a rubber.

The antioxidants or age-resisters of the present invention are obtained by condensing a ketone with an amino substituted diarylene compound. In accordance with this invention it has been discovered that the condensation products of ketones and amines containing the nucleus

which nucleus contains at least one primary amino substituent and where the R's are ortho arylene groups and X is a nonmetallic divalent bridge forming group, comprise an effective group of antioxidants. Examples of amines which may be condensed with ketones to form the new antioxidants comprise the amino diarylene furans as for example amino dibenzo furan, amino αα dinaphtho furan, amino ββ dinaphtho furan and amino iso dinaphtho furan, the amino diarylene thiophens as for example amino dinaphtho thiophen and amino dibenzo thiophen, the amino fluorenes as for example amino chryso fluorene, amino iso naphtho fluorene, amino picene fluorene and its isomers amino αα dinaphtho fluorene and amino ββ dinaphtho fluorene, the amino diarylene pyrroles as for example amino dibenzo pyrrole (amino carbazole), the amino naphtho benzo pyrroles, the amino dinaphtho pyrroles and the amino phenanthro benzo pyrroles. Amines of this class may be prepared by nitrating, preferably mono nitrating, the diarylene compound and reducing the nitro group to an amino group. In the case of the pyrrole derivatives the N nitroso compound is first prepared and this nitrated followed by removal of the nitroso group in known manner and reduction of the nitro group to an amino group. All of these reactions are well known and understood.

Examples of suitable ketones with which the amines may be condensed to form the new age resisters comprise acetone, diacetone alcohol, mesityl oxide, phorone, isophorone, methyl ethyl ketone, acetophenone, benzophenone, diethyl ketone, dimethyl ketone, di n propyl ketone, di isopropyl ketone, methyl isobutyl ketone, benzoyl acetone, hydracetyl acetone, monochlor acetone, dichlor acetone, acetonyl acetone, ethylidene acetone, allyl acetone, hydroxy acetone, cyclohexanone, methyl cyclohexanone and equivalents and analogues thereof.

There is considerable variation in the effectiveness of the new condensation products depending upon the position and number of the amino groups and the ketone with which they are condensed. It is preferred to employ the condensation products of aliphatic ketones and the amino diarylene compounds of the structure

in which one of the ortho arylene groups represented by R contains a single primary amino substituent and where X has the same significance as before. Best results are obtained where a single primary amino group is linked in the 2 or 3 position in the nucleus

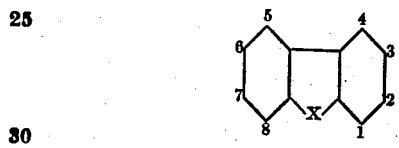

where X is methylene, oxygen or sulfur. The acetone condensation products of these amines are equal to the most effective antioxidants known for a rubber.

The age resisting characteristics of a vulcanized rubber product can be readily ascertained by subjecting samples of the vulcanized product in a bomb to the action of air or oxygen under elevated temperature and pressure. The aged rubber samples are then examined and tested and the test data compared with the results obtained on testing the unaged rubber samples. The deterioration in properties effected as a result of the oxidation is indicative of the result that would normally be expected of that particular stock during actual service. Such a test produces an effect on a vulcanized rubber stock comparable with that resulting from several years of natural aging of the rubber depending upon the conditions of the test. When subjected to this test the preferred class of compounds show a powerful preservative effect and rubber stocks containing the new compounds retain, after aging, a high percentage of their original tensile strength.

As illustrative of the action of the new compounds but without limiting the invention, rubber stocks were compounded comprising

|  | Stock | | |
|---|---|---|---|
|  | A | B | C |
|  | Parts by weight | Parts by weight | Parts by weight |
| Smoked sheets rubber | 100 | 100 | 100 |
| Carbon black | 50 | 50 | 50 |
| Zinc oxide | 5 | 5 | 3 |
| Sulfur | 3 | 3 | 3 |
| Stearic acid | 3 | 3 | 3 |
| Pine tar | 2 | 2 | 2 |
| Benzoyl thio benzothiazole | 0.8 | 0.8 | 0.8 |
| Diphenyl guanidine | 0.2 | 0.2 | 0.2 |
| Acetone-2 amino fluorene | 1.0 |  |  |
| Acetone-2 amino dibenzo furan |  | 1.0 |  |
| Commercial antioxidant |  |  | 1.0 |

The condensation product of acetone and 2-amino fluorene in the A stock was prepared by passing acetone vapor into the amine at 130° C. in the presence of a little iodine as catalyst. The product after recrystallizing from alcohol melted at 158–162° C. The condensation product of acetone and 2-amino dibenzo furan contained in the B stock was prepared in similar manner. Acetone vapor was passed into the amine at 110–115° C. in the presence of a little iodine for about 48 hours. The soft resin obtained was heated under 3 mm. pressure to remove any unreacted material but the distillation was stopped when the product began to distill over and the residue comprising the composite reaction product was incorporated into the rubber stock. The antioxidant in the C stock is a powerful commercial antioxidant and anti-flexing agent of recognized importance prepared by condensing acetone and para amino diphenyl.

The rubber stocks so compounded were vulcanized in the usual manner by heating in a press for different periods of time and samples of the vulcanized products were artificially aged by heating at 158° F. in a bomb for 120 hours under 300 pounds oxygen pressure per square inch. The percentage of the original tensile strength retained after aging is set forth in the table below.

Table

| Stock | Cure (time in mins.) | Hours aged | Tensile retained, per cent |
|---|---|---|---|
| A | 60 | 120 | 38 |
| B | 60 | 120 | 32 |
| C | 60 | 120 | 34 |
| A | 75 | 120 | 36 |
| B | 75 | 120 | 33 |
| C | 75 | 120 | 32 |
| A | 90 | 120 | 31 |
| B | 90 | 120 | 30 |
| C | 90 | 120 | 31 |

The foregoing data show that the age resisting properties of the preferred class of materials are fully equivalent to those of the established commercial antioxidant.

The flex cracking resistance of the vulcanized rubber products was determined on a flexing machine as set forth by L. V. Cooper, Analytical Edition of Industrial and Engineering Chemistry, vol. 2, No. 4, 1930, pages 391–394. All three stocks underwent approximately the same number of flexings before failure. Likewise, after aging seven days in an oven at 70° C., while the total number of flexings before failure was smaller, all three stocks were approximately equivalent. Since the control stock C contained a well known flexing agent, this shows that the new class of materials combine valuable flex resisting properties with their age resisting characteristics and both to a degree found only in the most effective materials known.

As mentioned above, the foregoing examples are only illustrative of the invention and other condensation products of ketones and amino diarylene compounds may be used. Mention may be made of the condensation product of acetone and 9 amino fluorene and the condensation product of acetone and 2,7 diamino fluorene, however, the age resisting properties of these products were inferior to those of products obtained from mono amines having the amino group linked to one of the arylene radicals. Other examples comprise the condensation product of acetone and the following amines: 3 amino fluorene, 3 amino dibenzo furan, 3 amino dibenzo thiophen, 2 amino carbazole, 3 amino carbazole, 1,2 diamino fluorene, 1 amino dibenzo furan, 4 amino dibenzo furan, 2,7 diamino dibenzo furan, 1,8 diamino dibenzo furan, 2,7 diamino dibenzo thiophen, 4 amino dibenzo thiophen, 1 amino carbazole, 3,6 diamino carbazole, 2,7 diamino carbazole and 9 amino carbazole.

Furthermore, the method of condensing the ketone with the amine may vary widely from the procedure outlined above. While it has been found that the lower boiling ketones like methyl ethyl ketone and acetone react most efficiently by passing the vapor of the ketone into the hot amine in the presence of a condensation catalyst, the ketone may be refluxed or fused with the amine or heated under a presure greater than atmospheric in an autoclave. Suitable condensing agents include, in addition to iodine, sulfuric acid, benzene sulfonic acid, p-toluene sulfonic acid, bromine and the like. The condensations take place with elimination of water and where the ketone is passed into the reaction mixture in the form of vapor, the portion which escapes unreacted carries with it the water liberated in the reaction. The vapor after drying can then be recirculated through the system.

The products produced are believed to be quinoline bodies. For example the principal constituent of the condensation product of acetone and 2 amino fluorene is believed to possess the structure

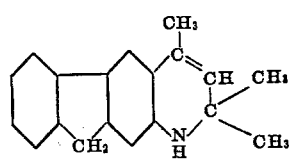

but the invention is not limited to any theory of structure and it is quite possible, especially where the amino group is not in the 2 or 3 position, that other types of compounds are formed. Furthermore, it should be understood that it is unnecessary to isolate pure constituents from the condensation products since the composite reaction products are eminently satisfactory.

Obviously, practice of this invention is not limited to the specific compositions given above, such compositions being merely illustrative of the manner of employing the antioxidants or age-resisters of this invention. The antioxidants or age-resisters may be employed in conjunction with other vulcanizing agents than those specifically disclosed, for this invention is applicable generally to pure rubber or rubber compositions of the most varied nature. Furthermore, the preferred class of materials may be employed in conjunction with other accelerators than those specifically shown with varying differences in tensile and modulus properties but still exhibiting the desirable properties of the class.

It is to be understood that the term "treating" as employed in the appended claims is used in a generic sense to include either the incorporating of the preferred class of materials into the rubber by milling or similar process or their addition to the rubber latex before its coagulation, or the application thereof to the surface of a mass of crude or vulcanized rubber. The term "a rubber" is employed in the claims to define a sulfur vulcanizable plastic material which possesses high extensibility under load coupled with the property of forcibly retracting to approximately its original size and shape after the load is removed. Examples of such products are India rubber, reclaimed rubber, balata, gutta percha, copolymers of butadiene and styrene and butadiene and acrylic nitrile and other natural or synthetically prepared vulcanizable products which deteriorate upon aging or exposure to the atmosphere by absorption of oxygen, whether or not admixed with fillers, pigments or accelerating agents.

The present invention is limited solely by the claims attached hereto as part of the present specification.

What is claimed is:

1. The method of preserving a rubber which comprises treating a rubber with the condensation product of an aliphatic ketone and a primary amine having the structure

where the R's are arylene groups at least one of which bears a primary amino group and X is a nonmetallic divalent bridge forming group completing a five membered ring said bridging group comprising an element which forms a heat stable hydride, any valences in excess of two being satisfied by hydrogen.

2. The method of preserving a rubber which comprises treating a rubber with the condensation product of an aliphatic ketone and a primary amine having the structure

where the R's are phenylene groups at least one of which bears a primary amino substituent and X is a nonmetallic divalent bridge forming group completing a five membered ring said bridging group comprising an element which forms a heat stable hydride, any valences in excess of two being satisfied by hydrogen.

3. The method of preserving a rubber which comprises treating a rubber with the condensation product of an aliphatic ketone and a primary amine having the structure

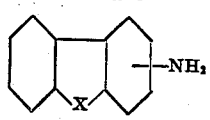

where X is a nonmetallic divalent bridge forming group completing a five membered ring said bridging group comprising an element which forms a heat stable hydride, any valences in excess of two being satisfied by hydrogen.

4. The method of preserving a rubber which comprises treating a rubber with the condensation product of acetone and a primary amine having the structure

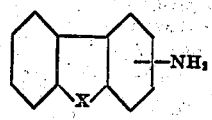

where X is a nonmetallic divalent bridge forming group completing a five membered ring said bridging group comprising an element which forms a heat stable hydride, any valences in excess of two being satisfied by hydrogen.

5. The method of preserving a rubber which comprises treating a rubber with the condensation product of acetone and a primary amine having the structure

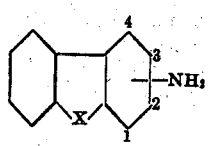

where the amino group is in the 2 or 3 position and X is an element of group VI of the periodic system of atomic weight less than 50.

6. The method of preserving India rubber which comprises treating India rubber with the condensation product of acetone and a primary amine having the structure

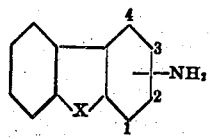

where the amino group is in the 2 or 3 position and X is of methylene

7. The method of preserving a rubber which comprises treating a rubber with the condensation product of acetone and 2 amino fluorene.

8. The method of preserving a rubber which comprises treating a rubber with the condensation product of acetone and 2 amino dibenzo furan.

9. The method of preserving a rubber which comprises treating a rubber with the condensation product of acetone and 3 amino dibenzo pyrrole.

10. The vulcanized rubber product obtained by treating a rubber with the condensation product of an aliphatic ketone and a primary amine having the structure

where the R's are arylene groups at least one of which bears a primary amino group and X is a nonmetallic divalent bridge forming group completing a five membered ring said bridging group comprising an element which forms a heat stable hydride, any valences in excess of two being satisfied by hydrogen.

11. The vulcanized rubber product obtained by treating a rubber with the condensation product of an aliphatic ketone and a primary amine having the structure

where the R's are phenylene groups at least one of which bears a primary amino substituent and X is a nonmetallic divalent bridge forming group completing a five membered ring said bridging group comprising an element which forms a heat stable hydride, any valences in excess of two being satisfied by hydrogen.

12. The vulcanized rubber product obtained by treating a rubber with the condensation product of an aliphatic ketone and a primary amine having the structure

where X is a nonmetallic divalent bridge forming group completing a five membered ring said bridging group comprising an element which forms a heat stable hydride, any valences in excess of two being satisfied by hydrogen.

13. The vulcanized rubber product obtained by treating a rubber with the condensation product of acetone and a primary amine having the structure

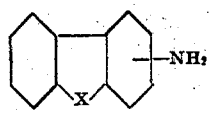

where X is a nonmetallic divalent bridge forming group completing a five membered ring said bridging group comprising an element which forms a heat stable hydride, any valences in excess of two being satisfied by hydrogen.

14. The vulcanized rubber product obtained by treating a rubber with the condensation product of acetone and a primary amine having the structure

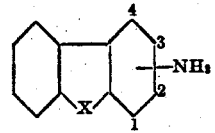

where the amino group is in the 2 or 3 position and X is an element of group VI of the periodic system of atomic weight less than 50.

15. The vulcanized rubber product obtained by treating India rubber with the condensation product of acetone and a primary amine having the structure

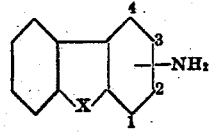

where the amino group is in the 2 or 3 position and X is of methylene.

16. The vulcanized rubber product obtained by treating a rubber with the condensation product of acetone and 2 amino fluorene.

17. The vulcanized rubber product obtained by treating a rubbeer with the condensation product of acetone and 2 amino dibenzo furan.

18. The vulcanized rubber product obtained by treating a rubber with the condensation product of acetone and 3 amino dibenzo pyrrole.

JOSEPH R. INGRAM.